US012762666B2

(12) United States Patent
Kim et al.

(10) Patent No.: US 12,762,666 B2
(45) Date of Patent: Oct. 13, 2026

(54) ELECTRONIC APPARATUS AND CONTROL METHOD THEREOF

(71) Applicant: Samsung Electronics Co., Ltd., Suwon-si (KR)

(72) Inventors: Shinhaeng Kim, Suwon-si (KR); Woonsung Park, Suwon-si (KR); Wonseok Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 18/824,405

(22) Filed: Sep. 4, 2024

(65) Prior Publication Data

US 2025/0157009 A1 May 15, 2025

Related U.S. Application Data

(63) Continuation of application No. PCT/KR2024/012123, filed on Aug. 14, 2024.

(30) Foreign Application Priority Data

Nov. 15, 2023 (KR) ........................ 10-2023-0158305

(51) Int. Cl.
*G06T 5/70* (2024.01)
*G06T 5/60* (2024.01)
*G06T 7/246* (2017.01)

(52) U.S. Cl.
CPC .................. *G06T 5/70* (2024.01); *G06T 5/60* (2024.01); *G06T 7/246* (2017.01); *G06T 2207/20081* (2013.01); *G06T 2207/20084* (2013.01)

(58) Field of Classification Search
CPC .............. G06T 5/70; G06T 7/246; G06T 5/60
See application file for complete search history.

(56) References Cited

U.S. PATENT DOCUMENTS 8,830,257 B2 9/2014 Watanabe
10,110,846 B2 * 10/2018 Chen .................... H04N 7/0127
(Continued)

FOREIGN PATENT DOCUMENTS

JP 2008-107753 5/2008
JP 2008-244811 10/2008
(Continued)

OTHER PUBLICATIONS

International Search Report, PCT/ISA/210, dated Nov. 22, 2024, in PCT Application No. PCT/KR2024/012123.
(Continued)

*Primary Examiner* — Jamie J Atala
(74) *Attorney, Agent, or Firm* — STAAS & HALSEY LLP

(57) ABSTRACT

An electronic apparatus including memory storing one or more instructions and at least one processor that is connected with the memory and controls the electronic apparatus, wherein the at least one processor is configured to, by executing the one or more instructions, identify an area where a motion is maintained in an input image, identify motion information of the identified area and representative motion information of the identified area, identify a motion correction value based on the identified motion information and the identified representative motion information, perform motion compensation for an input frame included in the input image by applying the identified motion correction value to the identified area, obtain an interpolation frame by applying the identified motion correction value to the identified area, and obtain an output image based on the input frame for which the motion compensation was performed and the obtained interpolation frame.

20 Claims, 10 Drawing Sheets

(56) References Cited

U.S. PATENT DOCUMENTS

| | | | | |
|---|---|---|---|---|
| 11,930,207 | B2 | 3/2024 | Yoshida | |
| 2007/0133685 | A1 | 6/2007 | Seong et al. | |
| 2007/0133686 | A1 | 6/2007 | Lee et al. | |
| 2008/0239144 | A1 | 10/2008 | Tanase et al. | |
| 2010/0085478 | A1 | 4/2010 | Yamamoto et al. | |
| 2023/0245273 | A1* | 8/2023 | Ishikuri | G06T 7/215 382/155 |
| 2023/0297833 | A1* | 9/2023 | Cho | G06F 18/214 382/155 |

FOREIGN PATENT DOCUMENTS

| | | |
|---|---|---|
| JP | 2009-181067 | 8/2009 |
| JP | 2010-34724 | 2/2010 |
| JP | 2011-135288 | 7/2011 |
| JP | 5255704 | 8/2013 |
| KR | 10-2006-0110179 | 10/2006 |
| KR | 10-2007-0063304 | 6/2007 |
| KR | 10-2007-0063369 | 6/2007 |
| KR | 10-2014-0134907 | 11/2014 |
| WO | WO 2020/039956 A1 | 2/2020 |

OTHER PUBLICATIONS

Written Opinion, PCT/ISA/237, dated Nov. 22, 2024, in PCT Application No. PCT/KR2024/012123.

* cited by examiner

ELECTRONIC APPARATUS AND CONTROL METHOD THEREOF

CROSS-REFERENCE TO RELATED APPLICATION(S)

This application is a bypass continuation of International Application No. PCT/KR2024/012123, filed on Aug. 14, 2024, which is based on and claims priority to Korean Patent Application No. 10-2023-0158305, filed on Nov. 15, 2023, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus that performs a motion compensation for an input image, and a control method thereof.

2. Description of the Related Art

Spurred by the development of electronic technologies, various types of electronic apparatuses are being developed and distributed. In particular, development and distribution of display apparatuses such as a TV and a mobile, etc. are actively going on.

As an example, for providing an image of better image quality to a user, various frame interpolation methods providing smooth motions are being studied.

SUMMARY

An electronic apparatus according to an embodiment of the disclosure includes memory storing one or more instructions and at least one processor configured to, by executing the one or more instructions, identify an area where a motion is maintained in an input image, identify motion information of the identified area and representative motion information of the identified area, identify a motion correction value based on the identified motion information and the identified representative motion information, perform motion compensation for an input frame included in the input image by applying the identified motion correction value to the identified area, obtain an interpolation frame by applying the identified motion correction value to the identified area, and obtain an output image based on the input frame for which the motion compensation was performed and the obtained interpolation frame.

According to an embodiment, the at least one processor may, by executing the one or more instructions, obtain the interpolation frame by using the identified motion correction value for the identified area, and not using the identified motion correction value for an area other than the identified area.

According to an embodiment, the at least one processor may, by executing the one or more instructions, perform motion compensation for the input frame by using the identified motion correction value for the identified area, and not using the identified motion correction value for the area other than the identified area.

According to an embodiment, the at least one processor may, by executing the one or more instructions, perform motion compensation for the identified area based on the identified motion correction value in a plurality of input frames included in the input image, and obtain an output image based on the obtained interpolation frame and the plurality of input frames for which the motion compensation was performed.

According to an embodiment, the at least one processor may, by executing the one or more instructions, obtain a plurality of motion vectors corresponding to the identified area in a plurality of input frames included in the input image, and identify a representative motion vector that is consistently maintained in the identified area based on the plurality of obtained motion vectors.

According to an embodiment, the at least one processor may, by executing the one or more instructions, identify motion correction values corresponding to each of the plurality of input frames based on difference values between each of the plurality of motion vectors corresponding to the identified area and the representative motion vector.

According to an embodiment, the at least one processor may, by executing the one or more instructions, identify motion correction values corresponding to each of the plurality of input frames by applying a predetermined filter to the difference values between each of the plurality of motion vectors corresponding to the identified area and the representative motion vector.

According to an embodiment, the at least one processor may, by executing the one or more instructions, identify the area where the motion is maintained based on motion vector statistical values for each of a plurality of pixel areas included in the input image, or identify the area where the motion is maintained by inputting the input image into a trained artificial intelligence model.

According to an embodiment, the at least one processor may, by executing the one or more instructions, identify a moving distance where a sum of differences of luminance values of pixels included in the identified area is minimum in a plurality of input frames included in the input image as a motion vector of the identified area.

According to an embodiment, the at least one processor may, by executing the one or more instructions, identify pixels included in the identified area as a plurality of pixel areas, and identify motion vectors of the identified area based on statistical values of motion vectors identified in units of the plurality of pixel areas.

According to an embodiment, the area where the motion is maintained may include an area where a text consistently moves in a specific location of the input image.

According to an embodiment, a control method of an electronic apparatus includes the steps of identifying an area where a motion is maintained in an input image, identifying motion information of the identified area and representative motion information of the identified area, identifying a motion correction value based on the identified motion information and the identified representative motion information, obtaining an output image by applying the identified motion correction value to the identified area, performing motion compensation for an input frame included in the input image by applying the identified motion correction value to the identified area, obtaining an interpolation frame by applying the identified motion correction value to the identified area, and obtaining an output image based on the input frame for which the motion compensation was performed and the obtained interpolation frame.

According to an embodiment, in a non-transitory computer readable medium storing computer instructions that make an electronic apparatus perform operations in case the instructions are executed by a processor of the electronic apparatus, the operations include the steps of identifying an area where a motion is maintained in an input image, identifying motion information of the identified area and representative motion information of the identified area, identifying a motion correction value based on the identified motion information and the identified representative motion information, obtaining an output image by applying the identified motion correction value to the identified area, performing motion compensation for an input frame included in the input image by applying the identified motion correction value to the identified area, obtaining an interpolation frame by applying the identified motion correction value to the identified area, and obtaining an output image based on the input frame for which the motion compensation was performed and the obtained interpolation frame.

BRIEF DESCRIPTION OF THE DRAWINGS

The above-described and other aspects, characteristics, and advantages of specific embodiments of the disclosure will become clearer from the following description described with reference to the accompanying drawings.

DETAILED DESCRIPTION

Figure 1:
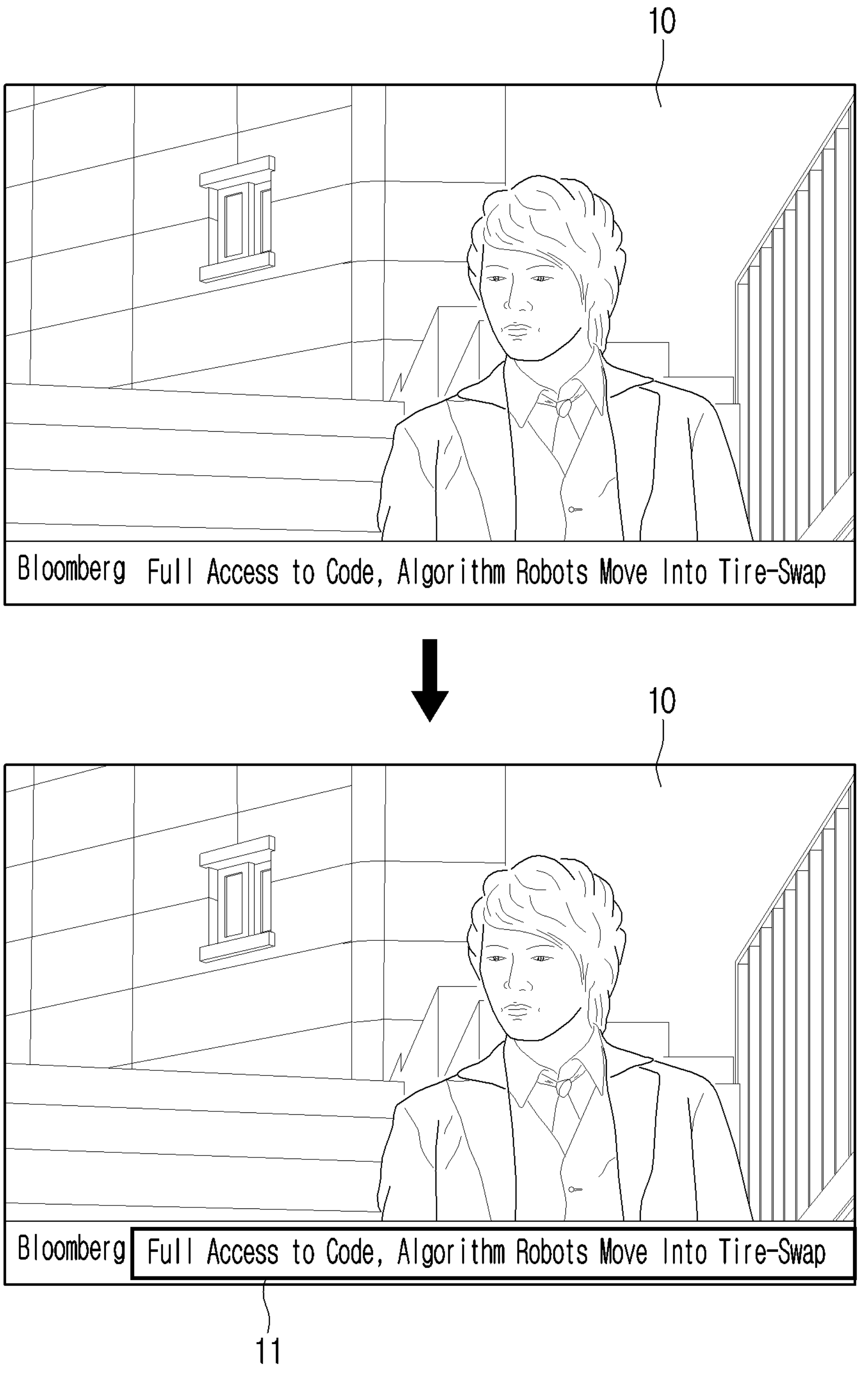
FIG. 1 is a diagram for illustrating an operation of an electronic apparatus according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including only A, (2) including only B, or (3) including both of A and B.

Further, the expressions "first," "second," and the like used in this specification may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, singular expressions include plural expressions, unless defined obviously differently in the context. Further, in the disclosure, terms such as "include" or "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the embodiments of the disclosure, "a module" or "a part" performs at least one function or operation, and may be implemented as hardware or software, or as a combination of hardware and software. Also, a plurality of "modules" or "parts" may be integrated into at least one module and implemented as at least one processor (not shown), except "a module" or "a part" that needs to be implemented as specific hardware.

Meanwhile, various elements and areas in drawings were illustrated schematically. Accordingly, the technical idea of the disclosure is not limited by the relative sizes or intervals illustrated in the accompanying drawings.

Hereinafter, an embodiment of the disclosure will be described in more detail with reference to the accompanying drawings.

FIG. 1 is a diagram for illustrating an operation of an electronic apparatus according to an embodiment of the disclosure.

According to the embodiment illustrated in FIG. 1, the electronic apparatus 100 may be implemented as various apparatuses equipped with a display function such as a monitor, a smart monitor, a smart TV, an electronic picture frame, an electronic blackboard, an electronic table, a laptop computer, digital signage, a digital information display (DID), a video wall, a projector, a tablet PC, etc.

The electronic apparatus 100 may receive various compressed images or images of various resolutions. For example, the electronic apparatus 100 may receive images in compressed forms such as moving picture experts group (MPEG) (e.g., MP2, MP4, MP7, etc.), joint photographic coding experts group (JPEG), advanced video coding (AVC), H.264, H.265, high efficiency video codec (HEVC), etc. Alternatively, the electronic apparatus 100 may receive any one image among a standard definition (SD) image, a high definition (HD) image, a full HD image, an ultra HD image, or an image of a higher resolution than them, etc.

According to an embodiment, the electronic apparatus 100 may perform frame rate conversion in case an input frame rate of an input image and an output frame rate of an output image are different. For example, the electronic apparatus 100 may perform frame rate conversion by estimating a motion by dividing an input image in block units which are a pixel or a bundle of one or more pixels based on the current frame and the previous fame, and performing frame interpolation of generating a new frame between the current frame and the previous frame by using the estimated motion.

According to an embodiment, during a process of converting a frame rate while compressing and transmitting an image, or for transmitting at a frame rate different from the frame rate at the time of manufacturing an image, phenomena of freezing of a motion, jumping, and speed change that did not exist in the original image may exist. For example, in the case of generating a new frame by simply interpolating between two input frames, it is estimated that there is no motion in case freezing of a motion occurred between the two input frames, and an interpolation frame is generated, and thus a freeze frame is generated. Also, in case a jumping phenomenon occurred between two frames, a big motion value is detected according to a motion that got quicker, and an interpolation frame that moves quickly is generated between the two frames. In this case, an interpolation frame is generated by estimating a motion between the two sheets of input images without special processing on the phenomena of freezing and quickening of a motion that existed in the input images.

For example, as illustrated in FIG. 1, in the case of a text 11 that generally moves at a constant speed in the lower part of a news image 10, a phenomenon wherein characters freeze for a short while in the middle while moving at a constant speed continuously, or jump quickly when they are resumed and then move again at a constant speed may occur. Alternatively, as the speed changes minutely, the pixel per frame (PPF) changes frequently. It is difficult to recognize such phenomena in case a text froze and then changes to another text, but such phenomena are easily observed in an image where there is a constant motion, and this gives an uncomfortable feeling to a viewer of the image.

Accordingly, hereinafter, various embodiments of providing a smooth motion through motion compensation in an area where a motion lasts will be explained.

Figure 2A:
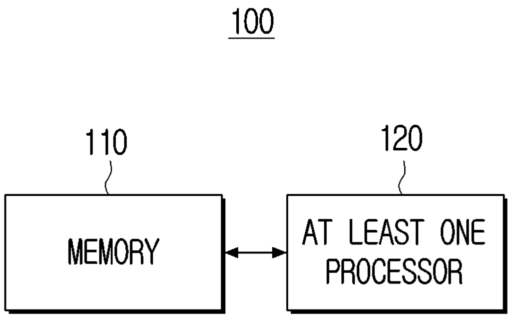
FIG. 2A is a block diagram illustrating a configuration of an electronic apparatus according to an embodiment of the disclosure.

FIG. 2A is a block diagram illustrating a configuration of an electronic apparatus according to an embodiment of the disclosure.

According to FIG. 2A, the electronic apparatus 100 includes memory 110 and at least one processor 120.

The memory 110 may store data necessary for various embodiments. The memory 110 may be implemented in a form of memory embedded in the electronic apparatus 100, or implemented in a form of memory that can be attached to or detached from the electronic apparatus 100 according to the usage of stored data. For example, in the case of data for operating the electronic apparatus 100, the data may be stored in memory embedded in the electronic apparatus 100, and in the case of data for an extended function of the electronic apparatus 100, the data may be stored in memory that can be attached to or detached from the electronic apparatus 100. Meanwhile, in the case of memory embedded in the electronic apparatus 100, the memory may be implemented as at least one of volatile memory (e.g.: dynamic RAM (DRAM), static RAM (SRAM), or synchronous dynamic RAM (SDRAM), etc.) or non-volatile memory (e.g.: one time programmable ROM (OTPROM), programmable ROM (PROM), erasable and programmable ROM (EPROM), electrically erasable and programmable ROM (EEPROM), mask ROM, flash ROM, flash memory (e.g.: NAND flash or NOR flash, etc.), a hard drive, or a solid state drive (SSD)). Also, in the case of memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), and external memory that can be connected to a USB port (e.g., a USB memory), etc.

The at least one processor 120 control the overall operations of the electronic apparatus 100. Specifically, the at least one processor 120 may be connected with each component of the electronic apparatus 100, and control the overall operations of the electronic apparatus 100. For example, the at least one processor 120 may be electrically connected with the display 130 and the memory 110, and control the overall operations of the electronic apparatus 100. The processor 120 may consist of one or a plurality of processors.

The at least one processor 120 may perform the operations of the electronic apparatus 100 according to various embodiments by performing at least one instruction stored in the memory 110.

The at least one processor 120 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 120 may control one or a random combination of the other components of the electronic apparatus, and perform an operation related to communication or data processing. Also, the at least one processor 120 may execute one or more programs or instructions stored in the memory. For example, the at least one processor 120 may perform the method according to an embodiment of the disclosure by executing the one or more instructions stored in the memory.

In case the method according to an embodiment of the disclosure includes a plurality of operations, the plurality of operations may be performed by one processor, or performed by a plurality of processors. For example, when a first operation, a second operation, and a third operation are performed by the method according to an embodiment, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor 120 may be implemented as a single core processor including one core, or it may be implemented as one or more multicore processors including a plurality of cores (e.g., multicores of the same kind or multicores of different kinds). In case the at least one processor 120 is implemented as multicore processors, each of the plurality of cores included in the multicore processors may include internal memory of the processor such as cache memory and on-chip memory, and common cache shared by the plurality of cores may be included in the multicore processors. Also, each of the plurality of cores (or some of the plurality of cores) included in the multicore processors may independently read a program instruction for implementing the method according to an embodiment of the disclosure and perform the instruction, or the plurality of entire cores (or some of the cores) may be linked with one another, and read a program instruction for implementing the method according to an embodiment of the disclosure and perform the instruction.

In case the method according to an embodiment of the disclosure includes a plurality of operations, the plurality of operations may be performed by one core among the plurality of cores included in the multicore processors, or they may be implemented by the plurality of cores. For example, when the first operation, the second operation, and the third operation are performed by the method according to an embodiment, all of the first operation, the second operation, and the third operation may be performed by a first core included in the multicore processors, or the first operation and the second operation may be performed by the first core included in the multicore processors, and the third operation may be performed by a second core included in the multicore processors.

In the embodiments of the disclosure, the processor may mean a system on chip (SoC) wherein at least one processor and other electronic components are integrated, a single core processor, a multicore processor, or a core included in the single core processor or the multicore processor. Also, here, the core may be implemented as a CPU, a GPU, an APU, a MIC, a DSP, an NPU, a hardware accelerator, or a machine learning accelerator, etc., but the embodiments of the disclosure are not limited thereto. Hereinafter, the at least one processor 120 will be referred to as the processor 120, for the convenience of explanation.

According to an embodiment, the processor 120 may identify an area where a motion is maintained in an input image. For example, the processor 120 may identify an area where a motion is maintained in an input image based on a plurality of input frames constituting the input image. For example, an area where a motion is maintained may be an area where a motion of an object lasts within a predetermined motion range across a plurality of input frames. Also, for example, an area where a motion is maintained may include an area where a text consistently moves in a specific location of an input image.

Then, the processor 120 may identify motion information of the identified area and representative motion information of the identified area. For example, the motion information of the identified area may be information where the motion in the identified area was digitized. For example, the motion information may include a motion vector. Also, for example, a line is constituted when objects included in the plurality of frames are connected, and the motions of the objects constitute strong directionality and make the speed felt. A force in a direction operated in a screen as above is referred to as a motion vector.

For example, the representative motion information of the identified area may be information where the motion in the identified area was statistically digitized. For example, the representative motion information may include a representative motion vector that was identified based on statistical values of a plurality of motion vectors corresponding to the identified area.

Then, the processor 120 may identify motion correction values based on the identified motion information and the identified representative motion information. For example, the processor 120 may identify motion correction values corresponding to each of the plurality of image frames based on difference values between each of the plurality of motion vectors corresponding to the identified area and the representative motion vector.

Then, the processor 120 may obtain an output image by applying the identified motion correction values to the identified area. For example, the processor 120 may obtain an output image by applying the identified motion correction values to the area identified in each of the input frames, and not applying the identified motion correction values to the area other than the identified area.

According to an embodiment, in case an input frame rate of an input image and an output frame rate of an output image are identical, it may not be necessary for the processor 120 to generate an interpolation frame. In this case, the processor 120 may obtain an output image by performing motion correction for a plurality of input frames included in the input image without generating an interpolation frame. An input frame rate of an input image is a numerical value indicating how many frames are included in the screen based on one second in the input image, and Hertz (Hz) may be used as the unit. An output frame rate of an output image is a numerical value indicating how many frames are included in the screen based on one second in the output image, and Hertz (Hz) may be used as the unit.

For example, the processor 120 may obtain an output frame by applying identified motion correction values for an area identified in each of a plurality of input frames, and not applying the identified motion correction values for the area other than the identified area. The output frame may be a frame output on the screen of the display 130.

According to another example, it may be necessary for the processor 120 to generate an interpolation frame as an input frame rate of an input image and an output frame rate of an output image are different. The processor 120 may obtain an interpolation frame by applying an identified motion correction value to an area identified in an input image, and not applying the identified motion correction value to the area other than the identified area. For example, the processor 120 may correct an input frame by applying identified motion correction values to an area identified in each of a plurality of input frames, and not applying the identified motion correction values to the area other than the identified area, and obtain an output frame including the corrected input frame and an interpolation frame.

According to an embodiment, the processor 120 may obtain a plurality of motion vectors corresponding to an area identified in a plurality of input frames, and identify a representative motion vector that is consistently maintained in the identified area based on the plurality of motion vectors.

According to an embodiment, the processor 120 may identify motion correction values corresponding to each of the plurality of image frames based on difference values between each of the plurality of motion vectors corresponding to the identified area and the representative motion vector. For example, the processor 120 may identify motion correction values corresponding to each of the plurality of input frames by applying a predetermined filter to the difference values between each of the plurality of motion vectors corresponding to the identified area and the representative motion vector.

According to an embodiment, the processor 120 may identify an area where a motion is maintained based on motion vector statistical values for each of a plurality of pixel areas included in the input image. Alternatively, the processor 120 may identify the area where the motion is maintained by inputting the input image into a trained artificial intelligence model. Alternatively, the processor 120 may identify the area where the motion is maintained by combining the identification results of the former and the latter.

According to an embodiment, the processor 120 may identify a moving distance where a sum of differences of luminance values of pixels included in the identified area is minimum in the plurality of input frames included in the input image as a motion vector of the identified area.

According to an embodiment, the processor 120 may identify the pixels included in the identified area as a plurality of pixel areas, and identify motion vectors of the identified area based on statistical values of motion vectors identified in units of the identified pixel areas.

Figure 2B:
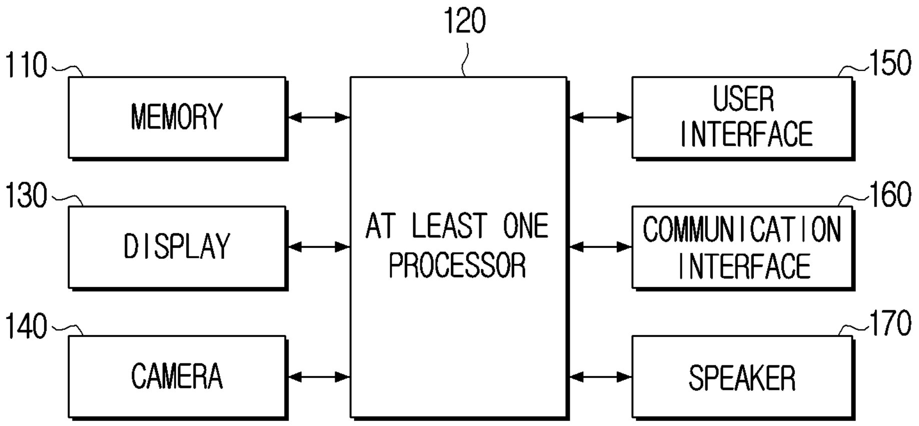
FIG. 2B is a block diagram illustrating in detail a configuration of an electronic apparatus according to an embodiment of the disclosure.

FIG. 2B is a block diagram illustrating in detail a configuration of an electronic apparatus according to an embodiment of the disclosure.

According to FIG. 2B, the electronic apparatus 100 may include memory 110, at least one processor 120, a display 130, a communication interface 140, a user interface 150, a camera 160, a speaker 170, and a sensor 180. Among the components illustrated in FIG. 2B, regarding components overlapping with the components illustrated in FIG. 2A, detailed explanation will be omitted.

The display 130 may be implemented as a display including self-luminous elements, or a display including non-self-luminous elements and a backlight. For example, the display 130 may be implemented as displays in various forms such as a liquid crystal display (LCD), an organic light emitting diodes (OLED) display, light emitting diodes (LEDs), micro LEDs, mini LEDs, a plasma display panel (PDP), a quantum dot (QD) display, quantum dot light emitting diodes (QLEDs), etc. Inside the display 130, driving circuits that may be implemented in forms such as an a-si TFT, a low temperature poly silicon (LTPS) TFT, an organic TFT (OTFT), etc., and a backlight unit, etc. may also be included together. According to an embodiment, on the front surface of the display 130, a touch sensor that has a form such as a touch film, a touch sheet, a touch pad, etc. and detects a touch operation may be arranged, and the display 130 may be implemented to detect various types of touch inputs. For example, the display 130 may detect various types of touch inputs such as a touch input by a user's hand, a touch input by an input device such as a stylus pen, a touch input by a specific electrostatic material, etc. Here, the input device may be implemented as an input device in a pen type that can be referred to as various terms such as an electronic pen, a stylus pen, an S-pen, etc. According to an embodiment, the display 130 may be implemented as a flat display, a curved display, a flexible display that can be folded and/or rolled, etc. Also, according to an embodiment, the processor 120 may display an obtained output image through the display 130.

The communication interface 140 can obviously be implemented as various interfaces depending on implementation examples of the electronic apparatus 100. For example, the communication interface 140 may perform communication with an external apparatus, an external storage medium (e.g., a USB memory), an external server (e.g., a webhard), etc. through communication methods such as Bluetooth, AP-based Wi-Fi (Wi-Fi, a wireless LAN network), Zigbee, a wired/wireless local area network (LAN), a wide area network (WAN), an Ethernet, the IEEE 1394, a high-definition multimedia interface (HDMI), a universal serial bus (USB), a mobile high-definition link (MHL), the Audio Engineering Society/European Broadcasting Union (AES/EBU), Optical, Coaxial, etc. Also, according to an embodiment, the communication interface 140 may perform communication with another electronic apparatus, an external server, and/or a remote control apparatus, etc. Further, according to an embodiment, the processor 120 may receive an input image through the communication interface 140.

The user interface 150 may be implemented as a device such as a button, a touch pad, a mouse, and a keyboard, or may be implemented as a touch screen that can perform the aforementioned display function and a manipulation input function together, etc.

The camera 160 may be turned on according to a predetermined event, and perform photographing. The camera 160 may convert a photographed image into an electric signal, and generate image data based on the converted signal. For example, a subject may be converted into an electric image signal through a semiconductor optical element (a charge coupled device (CCD)), and the image signal converted as such may be amplified and converted into a digital signal, and then go through signal processing. For example, the camera 160 may be implemented as a general camera, a stereo camera, a depth camera, etc.

The speaker 170 may be a component that outputs not only various kinds of audio data but also various kinds of notification sounds or voice messages, etc. The processor 120 may control the speaker 170 to output feedbacks or various kinds of notifications according to the various embodiments of the disclosure in audio forms.

The sensor 180 may include various types of sensors such as a touch sensor, a proximity sensor, an acceleration sensor (or a gravity sensor), a geomagnetic sensor, a gyro sensor, a pressure sensor, a position sensor, a distance sensor, an illumination sensor, etc.

Other than the above, the electronic apparatus 100 may include a microphone (not shown), a tuner (not shown), and a demodulator (not shown), etc. depending on implementation examples.

The microphone (not shown) is a component for receiving inputs of user voices or other sounds, and converting them into audio data. However, according to another embodiment, the electronic apparatus 100 may receive a user voice input through an external apparatus through the communication interface 140.

The tuner (not shown) may tune a channel selected by a user among radio frequency (RF) broadcasting signals received through an antenna, or all pre-stored channels, and receive an RF broadcasting signal.

The demodulator (not shown) may receive a digital IF (DIF) signal converted at the tuner and demodulate the signal, and perform channel demodulation, etc.

Figure 3:
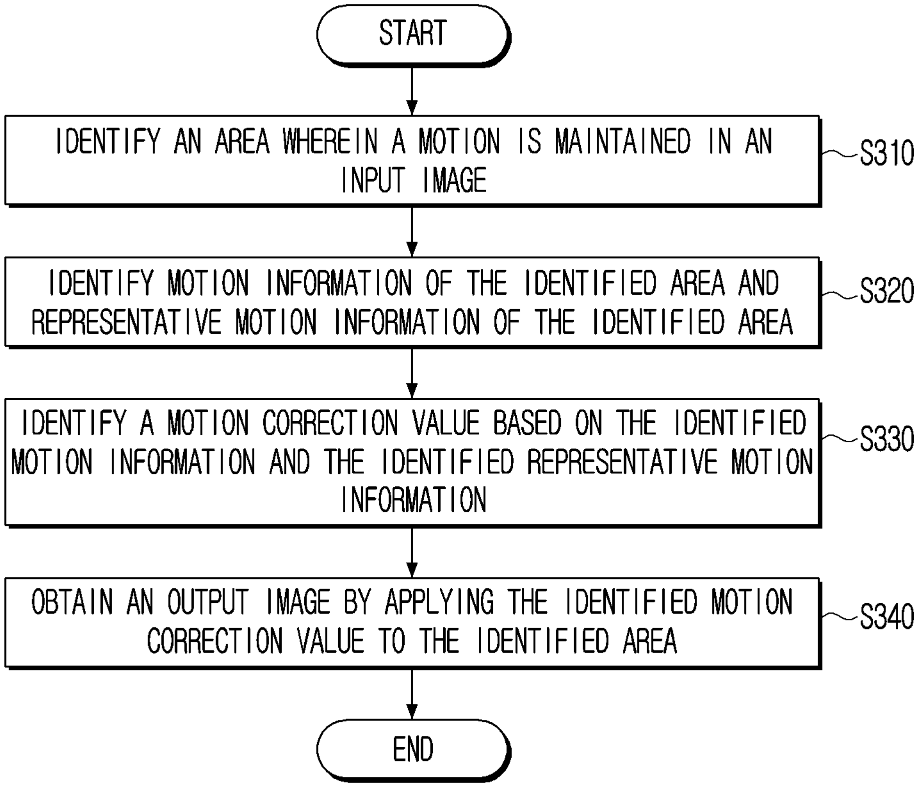
FIG. 3 is a flow chart for illustrating a control method of an electronic apparatus according to an embodiment of the disclosure.

FIG. 3 is a flow chart for illustrating a control method of an electronic apparatus according to an embodiment of the disclosure.

According to FIG. 3, the electronic apparatus 100 may identify an area where a motion is maintained in an input image in operation S310. For example, the area where the motion is maintained may include an area where a text consistently moves in a specific location of the input image. Also, for example, the electronic apparatus 100 may identify the area where the motion is maintained based on motion vector statistical values for each of a plurality of pixel areas included in the input image. Alternatively, the electronic apparatus 100 may identify the area where the motion is maintained by inputting the input image into a trained artificial intelligence model. Alternatively, the electronic apparatus 100 may identify the area where the motion is maintained by combining the identification results of the former and the latter.

Then, the electronic apparatus 100 may identify motion information of the identified area and representative motion information of the identified area in operation S320. For example, the electronic apparatus 100 may obtain a plurality of motion vectors corresponding to the identified area in a plurality of input frames included in the input image. Also, for example, the electronic apparatus 100 may identify a moving distance where a sum of differences of luminance values of pixels included in the identified area is minimum in the plurality of input frames included in the input image as a motion vector of the identified area. For example, the electronic apparatus 100 may identify the pixels included in the identified area as a plurality of pixel areas, and identify motion vectors of the identified area based on statistical values of motion vectors identified in units of the identified pixel areas. Then, the electronic apparatus 100 may identify a representative motion vector that is consistently maintained in the identified area based on the plurality of motion vectors.

Then, the electronic apparatus 100 may identify a motion correction value based on the identified motion information and the identified representative motion information in operation S330. For example, the electronic apparatus 100 may identify motion correction values corresponding to each of the plurality of input frames based on difference values between each of the plurality of motion vectors corresponding to the identified area and the representative motion vector. Also, for example, the electronic apparatus 100 may identify motion correction values corresponding to each of the plurality of input frames by applying a predetermined filter to the difference values between each of the plurality of motion vectors corresponding to the identified area and the representative motion vector.

Then, the electronic apparatus 100 may obtain an output image by applying the identified motion correction value to the identified area in operation S340. For example, the electronic apparatus 100 may obtain an output image by applying the identified motion correction values to the identified area in each of the input frames, and not applying the identified motion correction values to the identified area other than the identified area.

Meanwhile, in FIG. 3, the order was mapped to all steps for the convenience of explanation, but it is obvious that the order of steps which are regardless of an order, or can be performed in parallel, etc. is not necessarily limited to the order.

Figure 4:
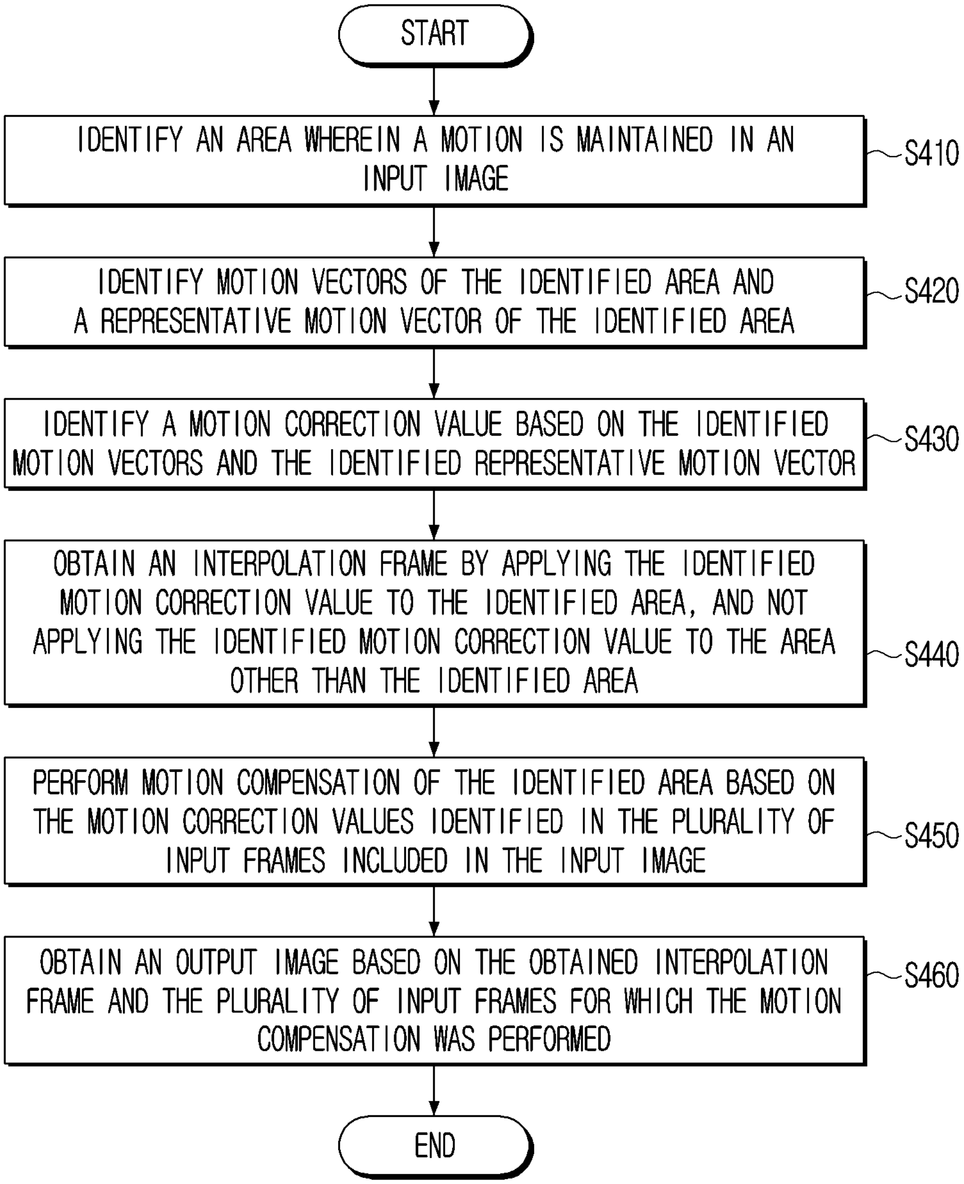
FIG. 4 is a flow chart for illustrating a control method of an electronic apparatus according to an embodiment of the disclosure.

FIG. 4 is a flow chart for illustrating a control method of an electronic apparatus according to an embodiment of the disclosure.

Among the operations illustrated in FIG. 4, regarding operations overlapping with the operations illustrated in FIG. 3, detailed explanation will be omitted.

According to FIG. 4, the electronic apparatus 100 may identify an area where a motion is maintained in an input image in operation S410.

Then, the electronic apparatus 100 may identify motion vectors of the identified area and a representative motion vector of the identified area in operation S420.

Then, the electronic apparatus 100 may identify a motion correction value based on the identified motion vectors and the identified representative motion vector in operation S430.

Then, the electronic apparatus 100 may obtain an interpolation frame by applying the identified motion correction value to the identified area, and not applying the identified motion correction value to the area other than the identified area in operation S440.

According to an embodiment, in case generation of an interpolation frame is necessary as the input frame rate of the input image and the output frame rate of the output image are different, the electronic apparatus 100 may obtain an interpolation frame by applying the identified motion correction value to the identified area in the input image, and not applying the identified motion correction value to the area other than the identified area.

Then, the electronic apparatus 100 may perform motion compensation of the identified area based on the motion correction values identified in the plurality of input frames included in the input image in operation S450. For example, the electronic apparatus 100 may correct the input frames by applying the identified motion correct values for the area identified in each of the plurality of input frames, and not applying the identified motion correction values to the area other than the identified area.

Then, the electronic apparatus 100 may obtain an output image based on the obtained interpolation frame and the plurality of input frames for which the motion compensation was performed in operation S460.

Meanwhile, in FIG. 4, the order was mapped to all steps for the convenience of explanation, but it is obvious that the order of steps which are regardless of an order, or can be performed in parallel, etc. is not necessarily limited to the order.

Figure 5:
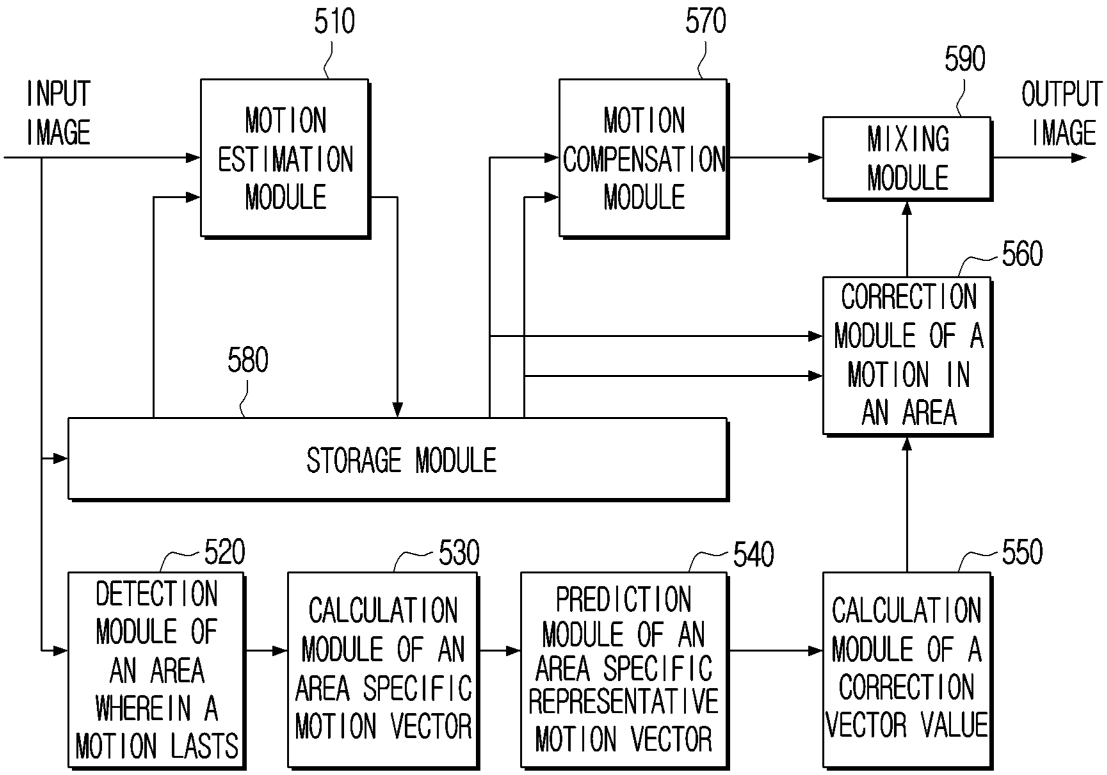
FIG. 5 is a diagram for illustrating in detail a method of obtaining an output image according to an embodiment of the disclosure.

FIG. 5 is a diagram for illustrating in detail a method of obtaining an output image according to an embodiment of the disclosure.

As illustrated in FIG. 5, the processor 140 may obtain an output image by using a motion estimation module 510, a detection module of an area where a motion lasts 520, a calculation module of an area specific motion vector 530, a prediction module of an area specific representative motion vector 540, a calculation module of a correction vector value 550, a correction module of a motion in an area 560, a motion compensation module 570, a storage module 580, and a mixing module 590. Here, each module may be implemented as a combination of at least one software, at least one hardware, and/or a combination thereof.

For example, at least one of the motion estimation module 510, the detection module of an area where a motion lasts 520, the calculation module of an area specific motion vector 530, the prediction module of an area specific representative motion vector 540, the calculation module of a correction vector value 550, the correction module of a motion in an area 560, or the motion compensation module 570 may be implemented to use a predefined algorithm, a predefined formula, and/or a trained artificial intelligence model. The motion estimation module 510, the detection module of an area where a motion lasts 520, the calculation module of an area specific motion vector 530, the prediction module of an area specific representative motion vector 540, the calculation module of a correction vector value 550, the correction module of a motion in an area 560, the motion compensation module 570, the storage module 580, and the mixing module 590 may be included in the electronic apparatus 100, but according to an embodiment, they may be dispersed in at least one external apparatus.

According to an embodiment, the processor 120 may perform motion estimation for an input image by using the motion estimation module 510. For example, the processor 120 may perform motion estimation by identifying a motion vector. According to an embodiment, the processor 120 may perform motion estimation by using a block matching algorithm, but the disclosure is not necessarily limited thereto.

For example, the processor 120 may divide an image frame into small blocks, and identify a motion vector corresponding to each block by predicting a block where the current block moved in terms of time. As an example, the processor 120 may identify a motion vector by using forward move estimation of estimating a move of a reference block by searching a search area in a subsequent frame based on a reference block identified in the previous frame. However, depending on cases, using backward move estimation may also be possible.

For example, the processor 120 may store a received input image, a motion estimation value obtained through the motion estimation module 510, etc. in the storage module 580. For example, the storage module 580 may be implemented as an example of the memory 110. Also, for example, the processor 120 may obtain a frame necessary for motion estimation from the storage module 580.

According to an embodiment, the processor 120 may identify an area where a motion is intended to be consistently maintained in an input image by using the detection module of an area where a motion lasts 520. For example, in a news image, an area where a text consistently moves may be identified in the lower part or a specific location. For example, if a motion vector for each location is calculated in an input image, the processor 120 may analyze the motion vectors calculated in the plurality of input frames and identify an area where a motion is intended to be consistently maintained (referred to as an area where a motion lasts hereinafter).

As an example, the processor 120 may identify an area where a motion lasts based on statistical values of the motion vectors calculated in the plurality of input frames. For example, the statistical values of the motion vectors may include at least one of a representative value, a median value, or an average value of the plurality of motion vectors.

Figure 6:
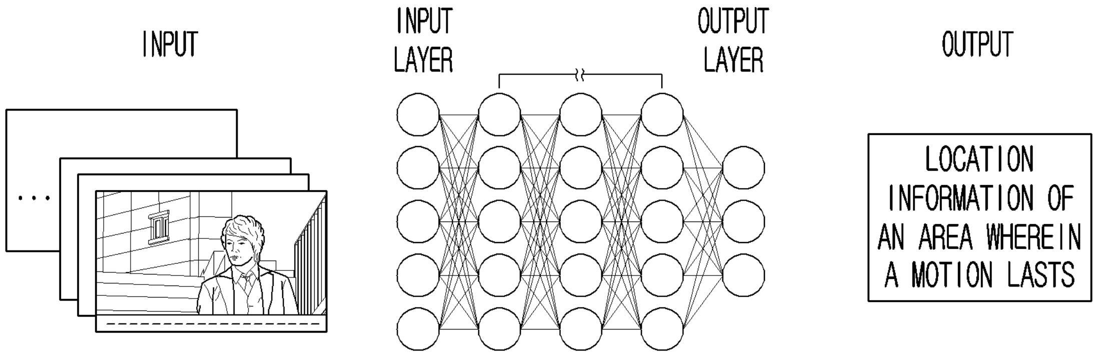
FIG. 6 is a flow chart for illustrating a control method of an electronic apparatus according to an embodiment of the disclosure.

As another example, the processor 120 may identify an area where a motion lasts by using an artificial intelligence model. For example, as illustrated in FIG. 6, the processor 120 may obtain information on an area where a motion lasts by inputting the plurality of input frames into an artificial intelligence model. For example, the information on an area where a motion lasts may include location information (or coordinate information) of the area.

An artificial intelligence model may learn location information of areas having constant speed that exist in an image based on a database including various types of input images. The feature that an artificial intelligence model is made through learning means that predefined operation rules or an artificial intelligence model having desired characteristics are made by applying a learning algorithm to a plurality of training data. Such learning may be performed in an apparatus itself wherein artificial intelligence is performed according to the disclosure, or through a separate server/system. An artificial intelligence model may consist of a plurality of neural network layers. At least one layer has at least one weight value, and performs an operation of the layer through the operation result of the previous layer and at least one defined operation. As examples of a neural network, there are a convolutional neural network (CNN), a recurrent neural network (RNN), a deep neural network (DNN), a restricted Boltzmann Machine (RBM), a deep belief network (DBN), a bidirectional recurrent deep neural network (BRDNN), deep Q-networks, and a transformer, but the neural network in the disclosure is not limited to the aforementioned examples excluding specified cases. Meanwhile, a learning algorithm is a method of training a specific subject apparatus by using a plurality of learning data and thereby making the specific subject apparatus make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

However, the method of identifying location information of an area where a motion lasts in an input image is not limited to the aforementioned examples, and various methods may be used depending on implementation examples.

According to an embodiment, the processor 120 may calculate a motion vector of an area where a motion lasts by using the calculation module of an area specific motion vector 530.

As an example, the processor 120 may calculate a motion vector of an area where a motion lasts by using two consecutive frames. For example, the processor 120 may calculate a moving distance as much as to a point where a difference of luminance values of pixels in two frames is the smallest as a motion vector. If luminance values of two consecutive frames are designated as $f_t(Y)$, $f_{t-1}(Y)$, and an area where a motion lasts is assumed as a rectangle for the convenience of explanation, when all pixel coordinates included in the horizontal width are designated as $b_j$, all pixel coordinates included in the vertical length are designated as $b_i$, a vertical range where a motion will be found is designated as $search\_range_y$, the horizontal range is designated as $search\_range_x$, and a sum of differences of luminance values in the area is designated as $MAD_{area}$, the $MAD_{area}$ may be defined as in the following formula 1.

[Formula 1]

$$MAD_{area}(x, y) = \sum_{m \in bj} \sum_{n \in bi} |f_t(Y)[m][n] - f_{t-1}(Y)[m+x][n+y]|$$

$$\text{for } 0 \leq b_j \leq \text{area width}, 0 \leq b_i \leq \text{area height},$$
$$-\text{search\_range}_x < x < \text{search\_range}_x,$$
$$-\text{search\_range}_y < y < \text{search\_range}_y$$

X and y values that make these values minimum among all ranges within the search range may be defined as the motion vector $MV(Dx,Dy)_t$ of the area. For example, min-$MAD_t$ and $MV(Dx,Dy)_t$ may be defined as in the following formulae 2 and 3.

$$\min MAD_t = \min(MAD_{area}(x, y)) \quad \text{[Formula 2]}$$
$$MV(Dx\ Dy)_t = x, y \text{ where } \min MAD_t \quad \text{[Formula 3]}$$

As another example, the processor 120 may group one or more pixels in an area and define them as blocks, and then extract motion vector values in block units, and calculate motion vectors based on statistical values of the motion vector values. For example, the statistical values of the motion vector values may include at least one of a representative value, an average value, or a median value. For example, the sizes of the pixel groups may be set in advance when the electronic apparatus 100 is manufactured, or may be set/changed by a user. Also, the sizes of the pixel groups are not fixed, and may be changed according to the resolution, the type, etc. of an input image.

However, the method of identifying a motion vector in an area where a motion lasts in an input image is not limited to the aforementioned examples, and various methods may be used depending on implementation examples.

According to an embodiment, the processor 120 may calculate a representative motion vector of an area where a motion lasts by using the prediction module of an area specific representative motion vector 540.

For example, the processor 120 may calculate a consistent representative motion vector by using a motion vector $MV(Dx,Dy)_t$ of an area where a motion lasts. For example, $MV(Dx,Dy)_t$ may be a motion vector calculated between frames $f_{t-1}$ and $f_t$. The processor 120 may calculate a consistent representative motion vector (or a predictive motion vector) that is maintained consistently over several times based on $MV(Dx,Dy)_t$. For example, the processor 120 may calculate a representative motion vector through Kalman filtering as in the following formula 4.

$$\text{Exp\_MV}(Dx, Dy)_t = KalmanFilter(Dx, Dy)_t \quad \text{[Formula 4]}$$

Figure 7:
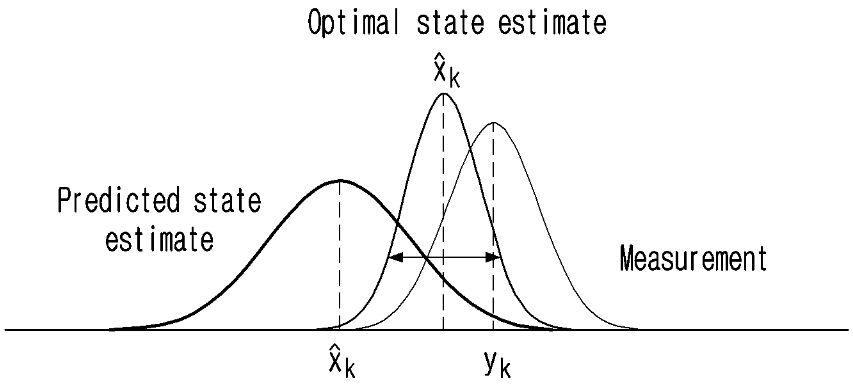
FIG. 7 is a diagram for illustrating a Kalman filtering method according to an embodiment of the disclosure.

For example, as illustrated in FIG. 7, the Kalman filter may be a recursive filter that estimates the next prediction value for a measurement value, and corrects the value through the measurement value again and derives an optimal prediction value. For example, a linear Kalman filter may be used, but the disclosure is not necessarily limited thereto. Meanwhile, for calculating a representative motion vector, other methods such as a histogram, an average value, etc. can obviously be used.

According to an embodiment, the processor 120 may calculate a difference value between a representative motion vector $\text{Exp\_MV}(Dx,Dy)_t$ and a motion vector $MV(Dx,Dy)_t$ in an area where a motion lasts by using the calculation module of a correction vector value 550. For example, a difference value between the representative motion vector $\text{Exp\_MV}(Dx,Dy)_t$ and the motion vector $MV(Dx,Dy)_t$ may be calculated as in the following formula 5.

$$diff(Dx, Dy)_t = MV(Dx, Dy)_t - \text{Exp\_MV}(Dx, Dy)_t \quad \text{[Formula 5]}$$

The processor 120 may use various functions func( ) as in the following formula 6 for using a motion difference value calculated through the formula 5 in motion correction. For example, the processor 120 may filter a motion difference value by using an infinite impulse response (IIR) filtering function, and use the result value as a motion correction value $Gap(Dx,Dy)_t$.

$$\text{Gap}(Dx, Dy)_t = func(diff(Dx, Dy)_t) \quad \text{[Formula 6]}$$

According to an embodiment, the processor 120 may correct an input frame and/or generate an interpolation frame by using the correction module of a motion in an area 560 and the motion compensation module 570.

According to an embodiment, in case frame rate conversion is necessary, the processor 120 may generate an interpolation frame. For example, the processor 120 may generate an interpolation frame by using a motion vector calculated through the calculation module of an area specific motion vector 530 for an area where a motion lasts, and by using a vector calculated through the motion estimation module 510 for an area other than the area. For example, the processor 120 may generate an interpolation frame based on the same method as the conventional method for an area other than the area where a motion lasts. Also, for example, the processor 120 may generate an interpolation frame based on a motion estimation value obtained through the motion estimation module 510 for an area other than the area where a motion lasts. Through this, a phenomenon wherein a motion may be processed to be partially different in an area where a motion lasts can be removed, and thus a motion that is spatially homogenous can be made to appear.

Also, the processor 120 may perform motion compensation for an interpolation frame generated based on the motion correction value $Gap(Dx,Dy)_t$ calculated in the formula 6. For example, if an interpolation frame generated by applying different methods according to areas is designated as fi, motion compensation at the coordinate x, y may be performed based on the following formula 7.

$$f_{out(x,y)} = f_t(x + \text{Gap}(Dx)_t, y + \text{Gap}(Dy)_t) \quad \text{[Formula 7]}$$

The processor 120 may not only generate an interpolation frame between a frame $f_{t-1}$ on the time t−1 and a frame $f_t$ on the time t, but also perform motion compensation by different methods for an area where a motion lasts and an area other than the area in an input frame itself, and may thereby convert the frames to new frames $$f'_{t-1} \text{ and } f'_t.$$

According to another example, in case frame rate conversion is not necessary, the processor 120 may perform motion compensation by different methods for an area where a motion lasts and an area other than the area regarding an input frame without an operation of generating an interpolation frame, and may thereby convert the frames to new frames $$f'_{t-1} \text{ and } f'_t.$$

According to an embodiment, the processor 120 may obtain an output image by mixing a corrected input frame and an interpolation frame by using the mixing module 590.

Figure 8:
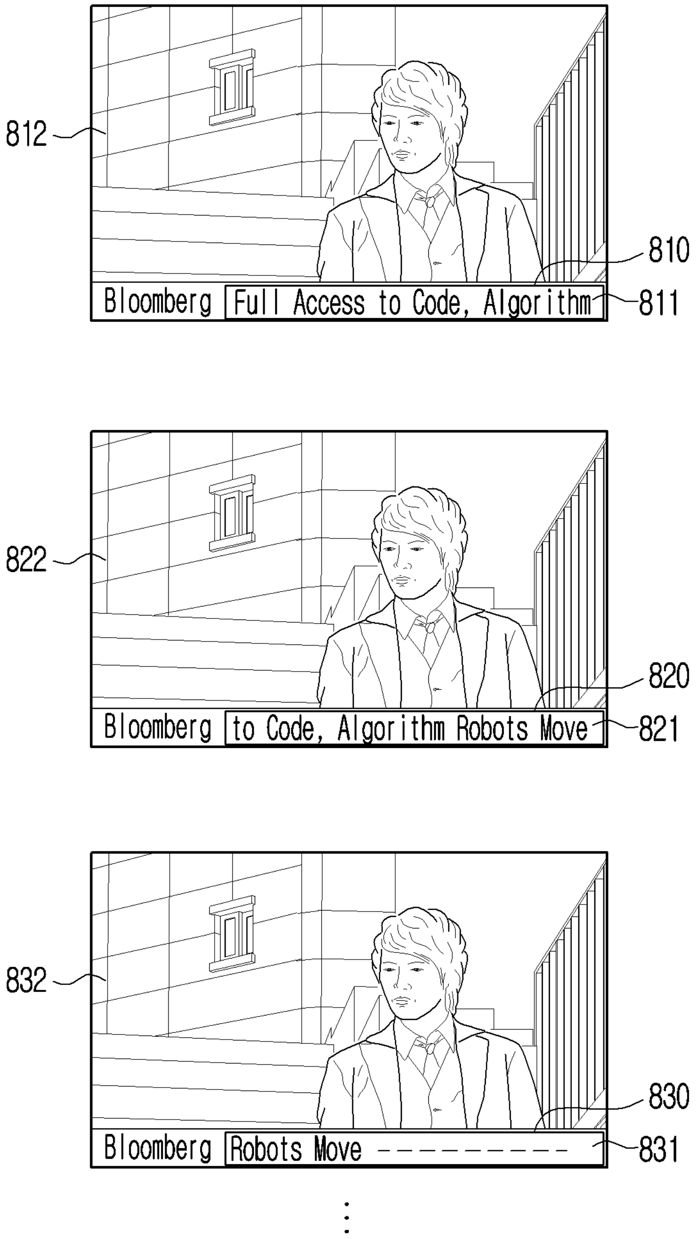
FIG. 8 is a diagram for illustrating a motion correction method in case frame rate conversion is not needed according to an embodiment of the disclosure.

FIG. 8 is a diagram for illustrating a motion correction method in case frame rate conversion is not needed according to an embodiment of the disclosure.

According to FIG. 8, the processor 120 may perform different motion compensation for each area regarding a plurality of input frames 810, 820, 830 included in an input image. For example, regarding areas where a motion lasts 811, 821, 822 identified in each of the plurality of input frames 810, 820, 830, the processor 120 may perform motion correction based on correction difference values calculated through the calculation module of an area specific motion vector 530, the prediction module of an area specific representative motion vector 540, and the calculation module of a correction vector value 550. Also, the processor 120 may not perform motion correction for the areas 812, 822, 832 other than the areas where a motion lasts 811, 821, 822 identified in each of the plurality of input frames 810, 820, 830.

Figure 9:
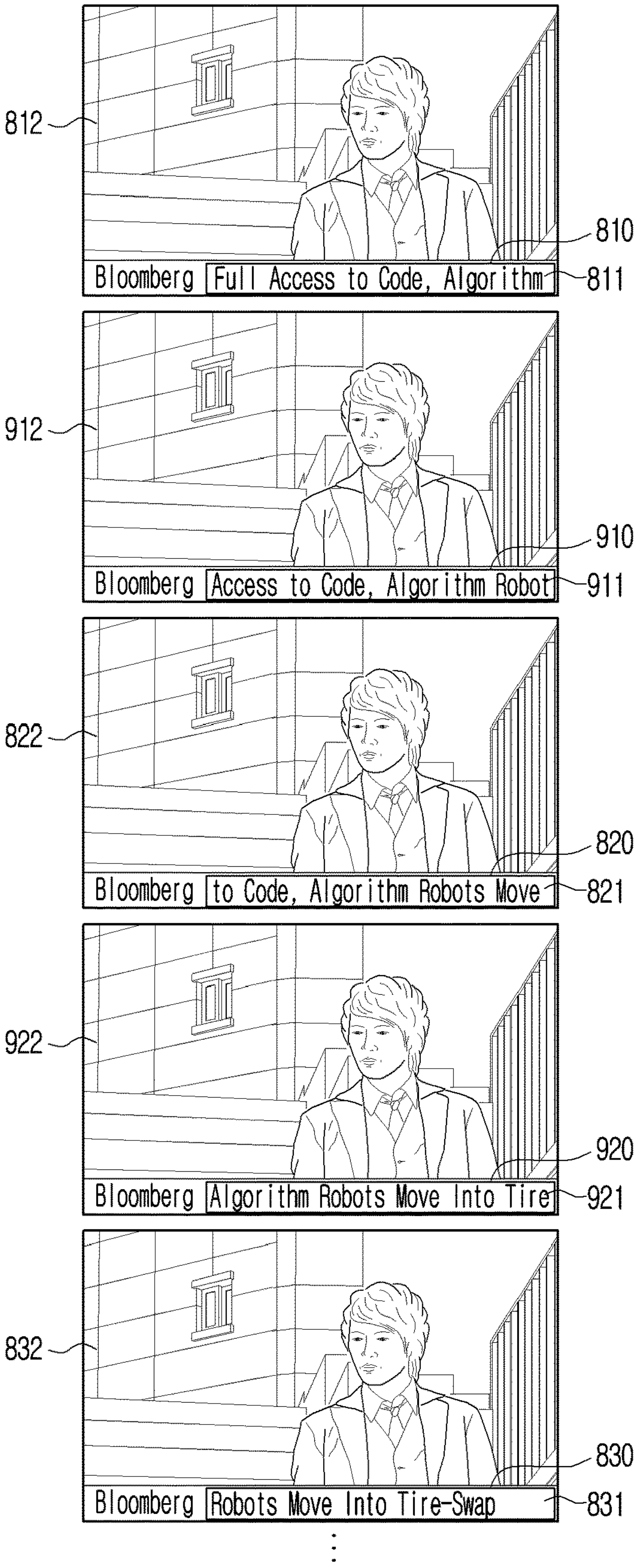
FIG. 9 is a diagram for illustrating a motion correction method in case frame rate conversion is needed according to an embodiment of the disclosure.

FIG. 9 is a diagram for illustrating a motion correction method in case frame rate conversion is needed according to an embodiment of the disclosure.

According to FIG. 9, the processor 120 may obtain interpolation frames 910, 920 based on the plurality of input frames 810, 820, 830 included in the input image. For example, regarding the areas where a motion lasts 811, 821, 822 identified in each of the plurality of input frames 810, 820, 830, the processor 120 may generate interpolation frames based on correction difference values calculated through the calculation module of an area specific motion vector 530, the prediction module of an area specific representative motion vector 540, and the calculation module of a correction vector value 550. In this case, the processor 120 may generate interpolation frames for the areas 812, 822, 832 other than the areas where a motion lasts 811, 821, 822 identified in each of the plurality of input frames 810, 820, 830 according to the conventional motion estimation. For example, the processor 120 may generate interpolation frames for the areas 812, 822, 832 other than the areas where a motion lasts 811, 821, 822 based on motion estimation values obtained through the motion estimation module 510.

Also, the processor 120 may perform motion compensation for each area regarding the plurality of input frames 810, 820, 830 included in the input image. For example, regarding the areas where a motion lasts 811, 821, 822 identified in each of the plurality of input frames 810, 820, 830, the processor 120 may perform motion correction based on correction difference values calculated through the calculation module of an area specific motion vector 530, the prediction module of an area specific representative motion vector 540, and the calculation module of a correction vector value 550. Also, the processor 120 may not perform motion correction for the areas 812, 822, 832 other than the areas where a motion lasts 811, 821, 822 identified in each of the plurality of input frames 810, 820, 830.

According to the aforementioned various embodiments, an area where a regular motion is consistently generated is identified in an input image, and phenomena of cut-off and jumping due to stoppage of the motion are detected and corrected for the area, and thus a smooth consistent motion can be provided in an output image. Accordingly, a phenomenon of cut-off of the motion may not be made to be recognized by a viewer, and thus the image quality of the output image can be improved.

Meanwhile, the methods according to the aforementioned various embodiments of the disclosure may be implemented just with software upgrade, or hardware upgrade for a conventional electronic apparatus.

Also, the aforementioned various embodiments of the disclosure may also be performed through an embedded server provided on an electronic apparatus, or through an external server of an electronic apparatus.

Meanwhile, according to an embodiment of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments (e.g.: an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the aforementioned various embodiments may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:

memory storing one or more instructions; and at least one processor is configured to, by executing the one or more instructions:

identify an area where a motion is maintained in an input image, identify motion information of the identified area and representative motion information of the identified area, identify a motion correction value based on the identified motion information and the identified representative motion information, perform motion compensation for an input frame included in the input image by applying the identified motion correction value to the identified area, obtain an interpolation frame by applying the identified motion correction value to the identified area, and obtain an output image based on the input frame for which the motion compensation was performed and the obtained interpolation frame.

2. The electronic apparatus of claim 1, wherein the at least one processor is configured to, by executing the one or more instructions:

obtain the interpolation frame by using the identified motion correction value for the identified area, and not using the identified motion correction value for an area other than the identified area.

3. The electronic apparatus of claim 2, wherein the at least one processor is configured to, by executing the one or more instructions:

perform motion compensation for the input frame by using the identified motion correction value for the identified area, and not using the identified motion correction value for the area other than the identified area.

4. The electronic apparatus of claim 1, wherein the at least one processor is configured to, by executing the one or more instructions:

obtain a plurality of motion vectors corresponding to the identified area in a plurality of input frames included in the input image, and identify a representative motion vector that is consistently maintained in the identified area based on the obtained plurality of motion vectors.

5. The electronic apparatus of claim 4, wherein the at least one processor is configured to, by executing the one or more instructions:

identify motion correction values corresponding to each of the plurality of input frames based on difference values between each of the plurality of motion vectors corresponding to the identified area and the representative motion vector.

6. The electronic apparatus of claim 5, wherein the at least one processor is configured to, by executing the one or more instructions:

identify motion correction values corresponding to each of the plurality of input frames by applying a predetermined filter to the difference values between each of the plurality of motion vectors corresponding to the identified area and the representative motion vector.

7. The electronic apparatus of claim 1, wherein the at least one processor is configured to, by executing the one or more instructions:

identify the area where the motion is maintained based on motion vector statistical values for each of a plurality of pixel areas included in the input image, or identify the area where the motion is maintained by inputting the input image into a trained artificial intelligence model.

8. The electronic apparatus of claim 1, wherein the at least one processor is configured to, by executing the one or more instructions:

identify a moving distance where a sum of differences of luminance values of pixels included in the identified area is minimum in a plurality of input frames included in the input image as a motion vector of the identified area.

9. The electronic apparatus of claim 1, wherein the at least one processor is configured to, by executing the one or more instructions:

identify pixels included in the identified area as a plurality of pixel areas, and identify motion vectors of the identified area based on statistical values of motion vectors identified in units of the plurality of pixel areas.

10. The electronic apparatus of claim 1, wherein the area where the motion is maintained comprises:

an area where a text consistently moves in a specific location of the input image.

11. A control method of an electronic apparatus, the control method comprising:

identifying an area where a motion is maintained in an input image;

identifying motion information of the identified area and representative motion information of the identified area;

identifying a motion correction value based on the identified motion information and the identified representative motion information;

obtaining an output image by applying the identified motion correction value to the identified area;

performing motion compensation for an input frame included in the input image by applying the identified motion correction value to the identified area;

obtaining an interpolation frame by applying the identified motion correction value to the identified area; and obtaining an output image based on the input frame for which the motion compensation was performed and the obtained interpolation frame.

12. The control method of claim 11, wherein the obtaining the output image comprises:

obtaining the interpolation frame by using the identified motion correction value for the identified area, and not using the identified motion correction value for an area other than the identified area.

13. The control method of claim 12, wherein the obtaining the output image comprises:

performing motion compensation for the input frame by using the identified motion correction value for the identified area, and not using the identified motion correction value for the area other than the identified area.

14. The control method of claim 11, wherein the identifying the motion information of the identified area and the representative motion information of the identified area comprises:

obtaining a plurality of motion vectors corresponding to the identified area in a plurality of input frames included in the input image, and identifying a representative motion vector that is consistently maintained in the identified area based on the obtained plurality of motion vectors.

15. A non-transitory computer readable medium storing computer instructions that make an electronic apparatus perform operations in case the instructions are executed by a processor of the electronic apparatus, wherein the operations comprise:

identifying an area where a motion is maintained in an input image;

identifying motion information of the identified area and representative motion information of the identified area;

identifying a motion correction value based on the identified motion information and the identified representative motion information;

obtaining an output image by applying the identified motion correction value to the identified area;

performing motion compensation for an input frame included in the input image by applying the identified motion correction value to the identified area;

obtaining an interpolation frame by applying the identified motion correction value to the identified area; and obtaining an output image based on the input frame for which the motion compensation was performed and the obtained interpolation frame.

16. The non-transitory computer-readable medium as claimed in claim 15, wherein wherein the obtaining the output image comprises:

obtaining the interpolation frame by using the identified motion correction value for the identified area, and not using the identified motion correction value for an area other than the identified area.

17. The non-transitory computer-readable medium as claimed in claim 16, wherein the obtaining the output image comprises:

performing motion compensation for the input frame by using the identified motion correction value for the identified area, and not using the identified motion correction value for the area other than the identified area.

18. The non-transitory computer-readable medium as claimed in claim 15, wherein the identifying the motion information of the identified area and the representative motion information of the identified area comprises:

obtaining a plurality of motion vectors corresponding to the identified area in a plurality of input frames included in the input image, and identifying a representative motion vector that is consistently maintained in the identified area based on the obtained plurality of motion vectors.

19. The non-transitory computer-readable medium as claimed in claim 15, wherein the identifying a motion correction value comprises:

identifying the motion correction values corresponding to each of the plurality of input frames based on difference values between each of the plurality of motion vectors corresponding to the identified area and the representative motion vector.

20. The non-transitory computer-readable medium as claimed in claim 15, wherein the identifying a motion correction value comprises:

identifying the motion correction values corresponding to each of the plurality of input frames by applying a predetermined filter to the difference values between each of the plurality of motion vectors corresponding to the identified area and the representative motion vector.

* * * * *